INVENTOR.
DIETER GLÄSER

April 7, 1970   D. GLASER   3,504,925
COLLAPSIBLE FRAME FOR A BABY CARRIAGE
Filed Oct. 6, 1967   6 Sheets-Sheet 3

INVENTOR.
DIETER GLÄSER
BY
Woodhams, Blanchard & Flynn
ATTORNEYS

April 7, 1970    D. GLASER    3,504,925
COLLAPSIBLE FRAME FOR A BABY CARRIAGE
Filed Oct. 6, 1967    6 Sheets-Sheet 4
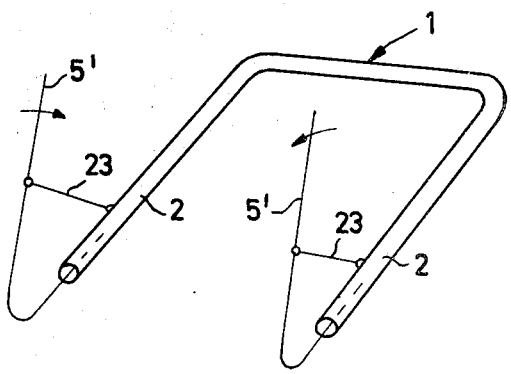
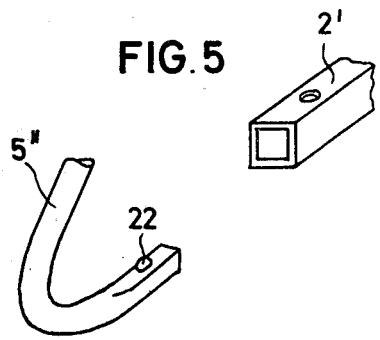
INVENTOR.
DIETER GLÄSER
BY
Woodhams, Blanchard & Flynn
ATTORNEYS April 7, 1970     D. GLASER     3,504,925
COLLAPSIBLE FRAME FOR A BABY CARRIAGE Filed Oct. 6, 1967     6 Sheets-Sheet 6

INVENTOR.
DIETER GLÄSER
BY
Woodhams, Blanchard & Flynn
ATTORNEYS

United States Patent Office 3,504,925
Patented Apr. 7, 1970

3,504,925
COLLAPSIBLE FRAME FOR A BABY CARRIAGE
Dieter Glaser, Garching, near Munich, Germany, assignor to Peggy Munchener Kinderwagenfabrik G.m.b.H. & Co., KG, Munich, Germany
Filed Oct. 6, 1967, Ser. No. 673,453
Claims priority, application Germany, Oct. 13, 1966, P 40,571
Int. Cl. B62b 7/08
U.S. Cl. 280—36                                                7 Claims

ABSTRACT OF THE DISCLOSURE

A collapsible frame for a baby carriage having a U-shaped base frame with the carriage wheels being rotatably supported thereon. A single side support member is connected to and slopes upwardly from each leg of the base frame. Lock means, such as toggle joints, interconnect the side support members to the base frame to hold same in the uncollapsed position. A pair of support arms are pivotally connected to the respective side support members and are movable from a substantially horizontal uncollapsed position wherein they are adapted for supporting a baby bed thereon to a collapsed position adjacent the side support members. Suitable lock means, such as toggle joints, permit the support arms to be horizontally locked in the uncollapsed position.

---

This invention relates to a collapsible frame for a baby carriage comprising a base frame with at least two longitudinal bars, wheels being connected to said base frame, said support assemblies being supported on the frame, support parts for a bed being supported on the side support assembly and a handle connected to the side support assemblies.

Known frames for baby carriages of this type have side support assemblies comprising essentially two supports, each forming scissors, said supports being pivoted to the base frame and carrying the support parts for the bed. When the frame of the baby carriage is being folded, said supports are lowered to rest on the base frame. Said frames use more room in the collapsed condition than is desired when transporting the carriage.

The purpose of the invention is to produce a frame for a baby carriage of the above-described type which is particularly small in the collapsed condition, but is built strongly and is stable in the position of use, and which can be collapsed easily and quickly.

To attain said purpose, the invention provides that each side support assembly is comprised of only one support which slopes upwardly when in the position of use and forms an acute angle with the longitudinal bar of the base frame associated therewith. The support is pivotally arranged on said longitudinal bar and is lockable in said use position. The support parts are constructed as two support arms being movable with respect to the supports and when in the position of use being lockable in such position on said supports. When in the position of use, each support arm together with the support associated therewith and the longitudinal bar of the base frame associated therewith forms almost the shape of a Z. The support arms can thus be folded close to the supports and they in turn can be bent close to the base frame so that the collapsed frame of the baby carriage is advantageously small and easily transportable. By eliminating one support, the frame is lighter which is desirable when said frame is being carried. The carriage in the uncollapsed condition of use looks light and elegant. Collapsing and setting up the frame is advantageously simplified because movement of the one support requires less strength than the pulling up and pressing down of a pair of scissors comprising two supports. Furthermore, manufacture of the frame of the baby carriage of the invention having only one support is less expensive.

Each support is advantageously swingably supported in an upward direction on the end of the longitudinal bar associated therewith and is lockable in the position of use by means of a toggle joint hingedly connected to the support and the longitudinal bar spaced away from their ends and being lockable in an elongated position. Setting up and folding of the frame of the baby carriage can be done by only a few simple operations. The supports, in a preferred embodiment, are swingable to an almost parallel position with respect to the longitudinal bars.

The supports can, by means of a projection, each be mounted to the end of the longitudinal bars in a way that they are pivotable about axes extending in the longitudinal direction thereof and can be locked in the position of use. Each support can advantageously be telescoped into an open end of the longitudinal bar by means of a projection and can there be locked in the position of use. A lock to prevent undesired rotation is achieved in a simple manner in a way that the projection of the support and the opening of the longitudinal bar have polygonal cross sections fitting into one another.

Together with the side supports, the support arms for the bed must be movable into the position of use quickly and in a simple manner and must be folded easily and in a space saving manner. This is advantageously made possible by pivoting the support arms to the supports and by locking same in the position of use by toggle joints pivoted to the support arms and the supports. Advantageously, both toggle joints for the supports and both toggle joints for the support arms can each be connected by a crossbar. Thus, the swinging movement of the crossbars causes synchronous movement of the toggle joints. Moreover, the crossbars help to stabilize the frame of the baby carriage when in the position of use.

It is advantageously space saving to provide a handle or pusher that can be movably mounted on the supports to adjust the height thereof. This is achieved by constructing said supports as tubes open on top to receive the legs of the pusher with said supports being provided with a clamping sleeve for locking the pusher at various heights. The pusher can, if desired, be stored separately. Its height can be adjusted as desired during movement of the baby carriage and, in spite of this, its legs do not require any extra space when the frame is in the collapsed position. In particular, the pusher does not extend beyond the collapsed frame.

Further details of the invention are disclosed in the description and the drawings. One embodiment of a frame for a baby carriage according to the invention is illustrated in the drawings, in which:

FIGURES 4 and 5 are schematical illustrations of details of modified embodiments.

Figure 1:
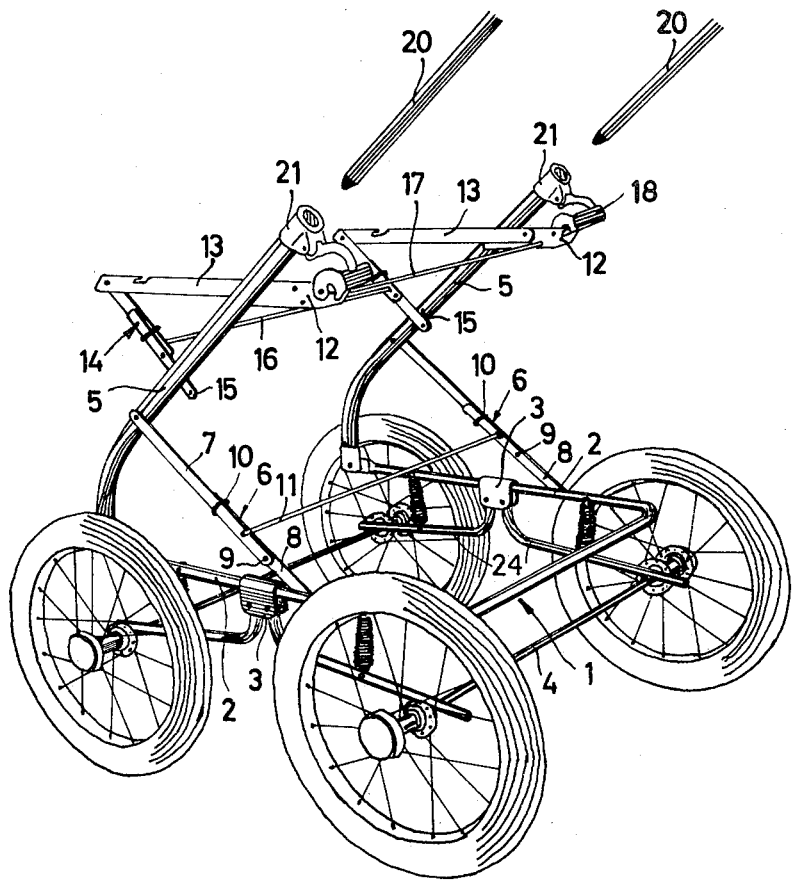
FIGURE 1 is a perspective illustration of a frame when in use.

The frame of the baby carriage of the invention comprises a U-shaped base frame 1, the legs of which comprise the longitudinal bars 2. The wheels are supported on wheel axles 4 which in turn are mounted to swinging levers 24 which are pivotally connected to holding devices 3 on the base frame 1 and which are supported by pressure springs 25 with respect to said base frame.

A support 5 made of bent tubing is pivoted with respect to height to the free end of each longitudinal bar 2. When the frame is in the position of use (FIGURE 1), said support 5 slopes upwardly and forms an almost acute angle together with the longitudinal bar 2 associated therewith. In this position, said support 5 is held by a toggle joint 6 which is pivoted through a lever 7 to the support 5 and through a lever 8 to the longitudinal bar 2. Said levers 7 and 8 are made of flat metal bars and are connected by a pivot joint 9. The end of lever 8 extends substantially beyond the joint 9. The toggle joint 6 is elongated when in the position of use. The extending end of said lever 8 rests against said lever 7 and is locked in this position by a ring 10 loosely movable on said lever 7 and here being moved over said levers 7 and 8. The extending end portions of both levers 8 are connected by a crossbar 11. Both ends of the crossbar 11 extend slightly beyond said levers 8 and engage, when in the position of use, recesses formed in the levers 7.

Each support 5 has, spaced away from its upper end, a tongue 12 tightly connected thereto. Each tongue has a support arm 13 used for supporting a removable bed (not illustrated) pivoted thereto such that said support arm 13, when in the position of use, projects from said support 5 approximately horizontally in the direction of the longitudinal axis of the frame but to the opposite side of the base frame 1. Said support arm 13, said support 5 and the longitudinal bars 2 thus form the shape of a Z (FIGURE 1).

Figure 2:
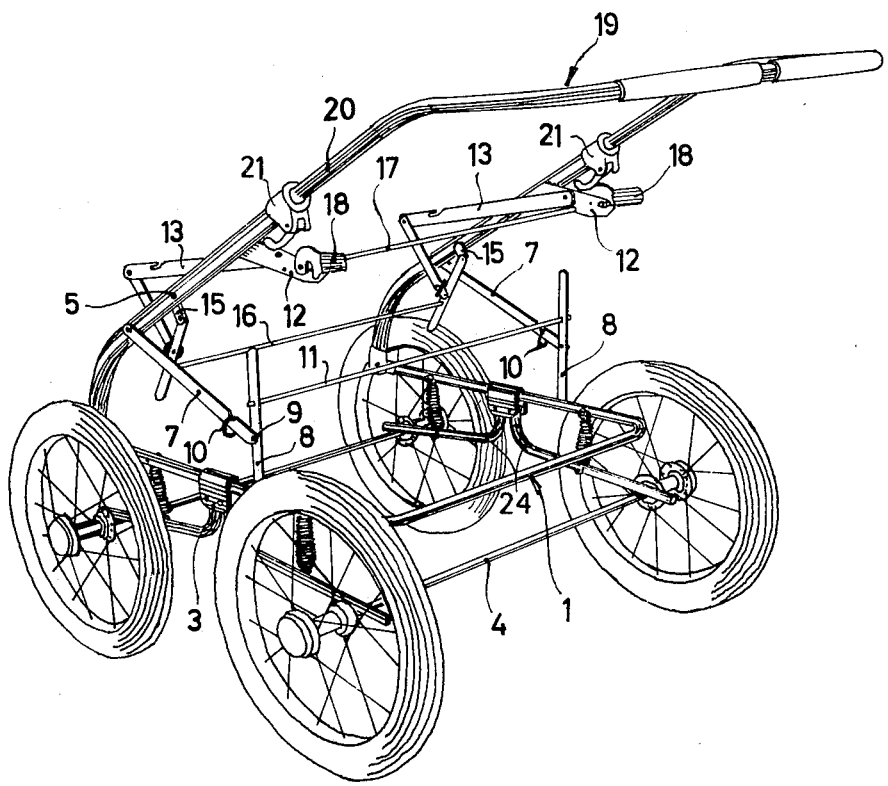
FIGURE 2 illustrates the same frame in a half-way collapsed position.

To lock the support arm 13 in the position of use, a toggle joint 14 is pivoted to the end of said support arm which is spaced from the support 5. The other end of said toggle joint 14 is pivoted to a tongue 15 as illustrated in FIGURE 2. The tongue 15 is fixedly mounted to support 5 away from the tongue 12. The toggle joint 14 has the same structural characteristics as the toggle joint 6 and is locked in the same manner. The toggle joints 14 also have two of the levers connected by a crossbar 16. A crossbar 17 connects both tongues 12. The crossbars 11, 16 and 17 reinforce the frame of the baby carriage when in the position of use and synchronize the adjusting movements.

The support arms 13 and the tongue 12 are provided with recesses for receiving the holding devices arranged on the bed. To lock the bed on the support arms 13, a locking device 18 is mounted to each tongue 12.

A U-shaped pusher member or handle 19, illustrated in FIGURE 2, can be telescoped into the supports 5 by means of its legs 20 and can there be locked at various heights by means of clamping sleeves 21.

Figure 3:
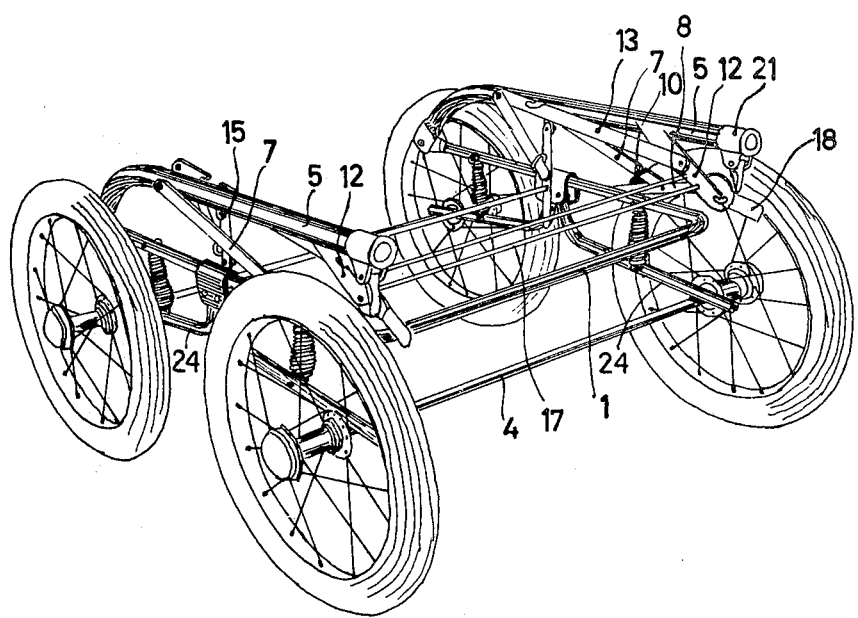
FIGURE 3 illustrates the same frame in a collapsed position.

To fold the frame of the baby carriage the lock of the toggle joints 14 must be released and same must be moved so that the support arms 13 are in a position almost parallel to said supports 5. After the rings 10 are released, the levers 7 and 8 are moved so that the supports 5 can be folded to lie against the base frame 1. FIGURE 3 illustrates said frame of the baby carriage in the collapsed condition without the pusher 19.

FIGURE 4 is a schematical illustration of a modified embodiment of the connection between the base frame 1 and the supports 5' of a frame for a baby carriage of the invention. Said supports 5' are not pivoted to the longitudinal bars 2 but can be telescoped therein. They are locked in this position by a known locking means, for example by a spring-loaded ball 22 as illustrated in FIGURE 5. A bar 23 arranged between the support 5' and the longitudinal bar 2 acts, alone or in addition to the ball 22, also as a locking device for the support 5' when in position of use. Said bar 23 is releasably mounted to said support 5' and is hingedly connected to the base frame 1. For folding the frame, said supports 5', after the lock on the bar 23 has been released, can be moved toward each other at almost 90° so as to lie substantially in the plane of the base frame 1. The supports 5' can also be constructed in a way that they can be removed entirely from said longitudinal bars 2.

FIGURE 5 illustrates a modified embodiment of the ends of the longitudinal bar 2' and of the projection of support 5". Both have a quadratic cross section. Said embodiment provides an additional safety against undesired rotation of support 5". During folding of the frame said support 5" is removed from said longitudinal bar 2 and can be inserted again, if necessary, after being rotated through 90°. The cross sections can also have the shape of a different polygon.

Figure 6:
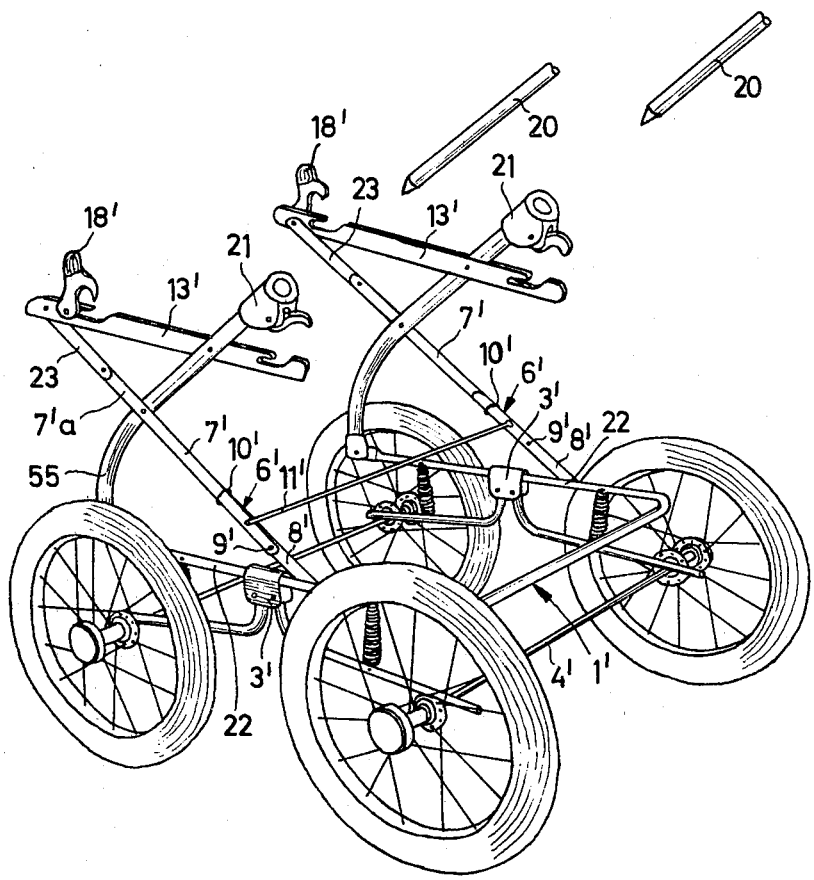
FIGURES 6 and 7 illustrate a further embodiment of the frame of the invention in a position corresponding to FIGURES 1 and 2.
Figure 7:
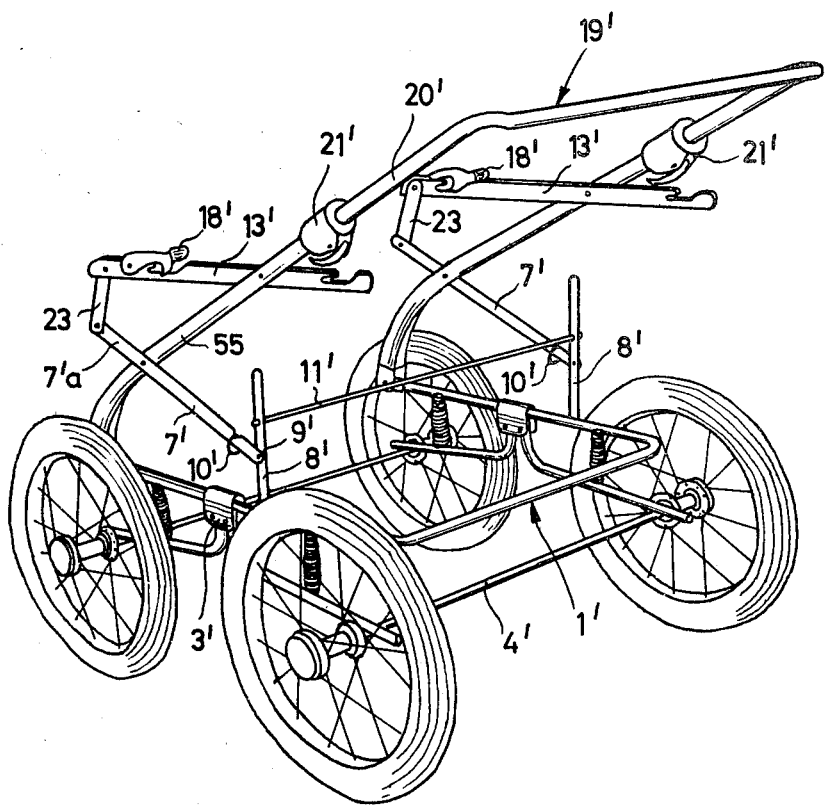

In the embodiments illustrated in FIGURES 6 and 7, most parts correspond to those illustrated in FIGURES 1 and 2. Aside from the supports identified with 55 and aside from the legs identified with 22, all corresponding parts are provided with the same reference numerals, the only difference being that said reference numerals are provided with primes. A discussion of said parts is therefore not necessary.

Contrary to the embodiment of FIGURES 1 and 2, the embodiment of FIGURES 6 and 7 illustrates the support arms 13' not being supported by their own toggle joints with respect to the supports 55. Rather, the levers 7' are extended beyond the supports 55 by means of a section 7'a. The free end of the extension 7'a is connected to the front end of the support arm 13' by a pivot link member 23.

If the frame is to be folded from the position of use as illustrated in FIGURE 6, only one lock comprising the ring 10' must be released. The toggle joints 6' can then be easily bent as is illustrated in FIGURE 2. By moving the supports 55 down onto the base frame 1', not only the toggle joint pair 6' is bent in completely, but the sections 7'a rotate counterclockwise relative to the supports 55 and pull the support arms 13' along during this movement over the members 23. The dimensions are chosen in a way that the support arms 13' are approximately in a horizontal position when the toggle joints 6' are in a straight position, while said support arms 13' when the supports 55 are completely lowered are in a position essentially parallel to said supports 55. Thus, the additional operation of FIGURES 1 and 2 is eliminated, namely, the movement of locking the support arms with respect to the supports. Said support arms 13' are, upon lowering of said supports, automatically moved into their rest position and, upon upward rotation of said supports, they are moved into the position of use. By locking the toggle joints 6', the position of use of the support arms 13' is fixed.

Although particular preferred embodiments of the invention have been disclosed above for illustrative purposes, it will be understood that variations or modifications thereof which lie within the scope of the appended claims are fully contemplated.

The embodiments of the invention in which an exclusive property or privilege is claimed are defined as follows:

1. A collapsible frame for a baby carriage comprising:
a base frame having wheels rotatably secured thereto and fixedly spaced from each other, said base frame comprising at least two longitudinally extending bars and a cross member connecting said longitudinal bars;
side support assemblies mounted on said base frame and comprising a pair of support members, one of said support members being pivotally mounted on each of said longitudinal bars at a location remote from said cross member and sloping upwardly therefrom to define an acute angle therewith, said support assemblies further including locking means for locking said support members in said upwardly sloping position of use and a handle;
a pair of support arms each freely pivotally mounted to one of said support members and including first toggle joint means hingedly interconnecting said support members and said support arms for locking said support arms in a horizontal position of use, each said support member being upwardly swingable about the end of the longitudinal bar associated therewith, said locking means comprising second toggle joint means hingedly connected to both of the support members and the longitudinal bars and lockable in an extended straight position to maintain said acute angle between said support members and said associated longitudinal bars, each of said support arms, said support members and said longitudinal bars associated therewith defining a collapsible Z-shaped frame when in said position of use.

2. A frame for a baby carriage as defined in claim 1, wherein the handle is U-shaped and is adjustable with respect to height and is removably mounted on the support members.

3. A frame for a baby carriage as defined in claim 2, wherein the support members are constructed as tubes open at the upper end for receiving the legs of the handle and are provided with clamping sleeves for locking the handle at various heights.

4. A frame for a baby carriage as defined in claim 1, wherein said second toggle joint means between the support members and the longitudinal bars are connected by a crossbar.

5. A frame for a baby carriage as defined in claim 1, wherein said first and second toggle joint means associated with each said support member include a common connecting member by which said first and second toggle joint means are connected together and said first and second toggle means are cooperable to support each of the support arms at the front end thereof.

6. A frame for a baby carriage as defined in claim 1, wherein said second toggle joint means extends beyond the hinged connection to said support members and is hingedly connected to said first toggle joint means; and
wherein said first toggle joint means comprises a link pivotally secured to the end of the extension of said second toggle joint means and said front end of the support arms.

7. A frame for a baby carriage as defined in claim 1 wherein said first and second toggle joint means are independent of each other, said first toggle joint means comprising first and second elements pivotally secured to said support arms and to said support members, respectively, and also pivotally secured to each other, said second toggle joint means comprising third and fourth elements pivotally secured to said support members and said longitudinal bars, respectively, and also pivotally secured to each other, said second and third elements being pivotable on said support members independently of each other.

References Cited
UNITED STATES PATENTS

| | | | |
|---|---|---|---|
| 3,222,081 | 12/1965 | Harmon | 280—36 |
| 3,365,210 | 1/1968 | Patterson | 280—36 |
| 2,678,219 | 5/1954 | Goodman | 280—41 |
| 2,781,225 | 2/1957 | Heideman | 280—36 |

LEO FRIAGLIA, Primary Examiner

R. R. SONG, Assistant Examiner